Oct. 12, 1948.  C. K. CHATTEN ET AL  2,450,880
BRITTLE POINT TESTING APPARATUS
Filed April 10, 1945  2 Sheets-Sheet 1

INVENTORS
Clarence K. Chatten
BY Saul A. Eller

ATTORNEY

Oct. 12, 1948.  C. K. CHATTEN ET AL  2,450,880
BRITTLE POINT TESTING APPARATUS
Filed April 10, 1945   2 Sheets-Sheet 2

INVENTORS
Clarence K. Chatten
BY Saul A. Eller

Ralph L. Chappell
ATTORNEY

Patented Oct. 12, 1948

2,450,880

UNITED STATES PATENT OFFICE 2,450,880

BRITTLE POINT TESTING APPARATUS

Clarence K. Chatten and Saul A. Eller,
New York, N. Y.

Application April 10, 1945, Serial No. 587,602

5 Claims. (Cl. 73—15.4)

(Granted under the act of March 3, 1883, as amended April 30, 1928; 370 O. G. 757)

This invention relates to an apparatus for determining the brittle points of elastic materials such as rubber, rubber derivatives, synthetic rubbers and the like, in cold air.

Many elastic products are destined for use under conditions of extreme cold, and it is highly desirable to determine in advance the lowest temperature at which various elastic materials can be flexed without cracking and breaking. Accurate determination of the brittle points of elastic materials permits accurate specification of materials for particular uses and indicates the limit of usefulness for all elastic materials under conditions of cold.

An object of this invention is to provide an apparatus for accurately determining the temperature at which elastic materials become brittle enough to break under flexure.

Another object is to provide an apparatus for determining the brittle points of numerous samples of elastic materials under exactly reproducible conditions.

Another object is to provide an apparatus for determining the brittle points of elastic materials in which the conditions of the tests, such as the radius of bend of the samples and the impact strength under which they are flexed, are readily adjustable.

Further objects and advantages of this invention, as well as its construction, arrangement and operation, will be apparent from the following description and claims in connection with the accompanying drawings, in which, Fig. 1 is an isometric view of the apparatus of this invention mounted in a conventional cold box.

The apparatus of this invention is mounted in a low-temperature cabinet or cold box of any suitable type. Such a cold box contains conventional refrigerating means, such as a chest for containing solid carbon dioxide or refrigerant tubes, air-impelling means for circulation such as fans, air-directing means such as baffles, vanes and ducts, temperature-regulating means and temperature-indicating means. The mechanism of such a cold box is entirely conventional and well known in the art, does not form a part of this invention, and accordingly is not shown.

Figure 1:
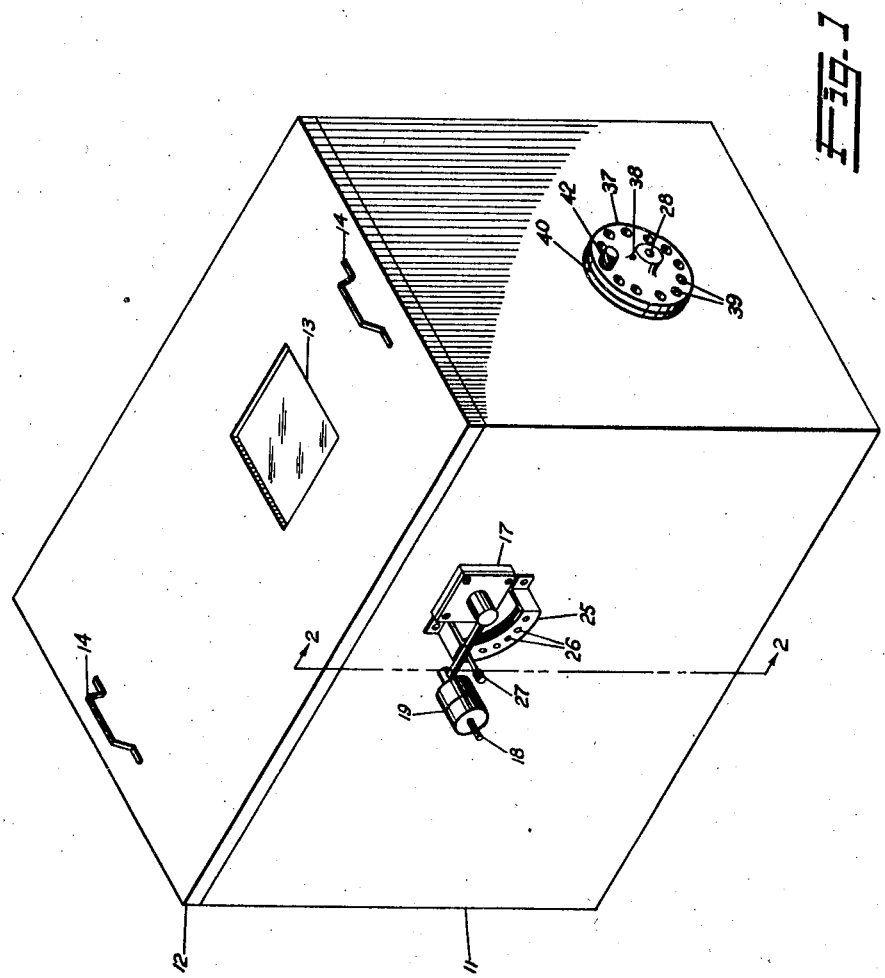
Figure 2:
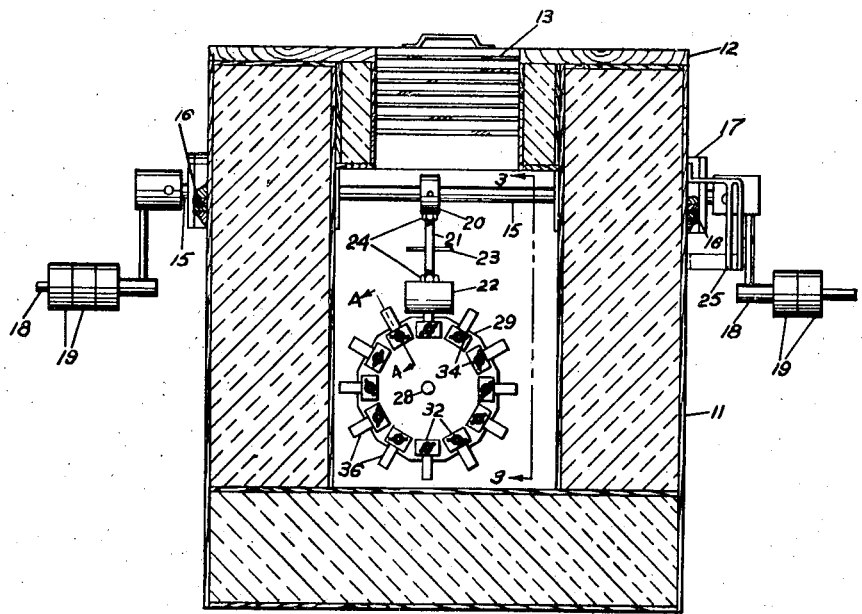
Fig. 2 is a sectional view along the line 2—2 of Fig. 1, the apparatus being shown in the position at which a sample of elastic material is being flexed.

Fig. 1 shows a conventional cold box 11 provided with a removable cover 12 which is provided with a multi-paned window 13 and handles 14. Shaft 15 extends completely through cold box 11 and is supported at either end by antifriction bearings 16, which are enclosed in housings 17 as shown in Fig. 2. Bearings 16 are located outside of cold box 11 so that their operation will not be affected by low temperatures. Rigidly keyed one to each end of shaft 15 are handles 18, on each of which can be placed weights 19.

In the interior of cold box 11, collar 20 is rigidly keyed to shaft 15. In threaded engagement with collar 20 is a radial arm 21 and in threaded engagement with the other end of arm 21 is hammer 22. The threaded ends of arm 21 are of opposite hand so that rotation of arm 21 relative to the collar 20 and the hammer 22 permits adjustment of the lineal distance of hammer 22 from the common axis of collar 20 and shaft 15. Adjustment pin 23 extends through arm 21 approximately midway of its length, and facilitates adjustment of the effective length of arm 21. Lock nuts 24 are provided to insure retention of any adjusted relationship desired between arm 21 and the collar 20 and the hammer 22. Arm 21 and the handles 18 are all in a common plane and extend from shaft 15 in the same direction. Bracket or control jig 25 is mounted in a suitable manner upon an outer surface of the cold box 11 in such a manner that its outer surface is adjacent to the path of travel of the shank of one of handles 18 as shown in Fig. 1. Bracket 25 is provided with a suitable number of drilled holes 26 adapted to receive pin 27. The centers of holes 26 are substantially equidistant from the axis of shaft 15.

Figure 3:
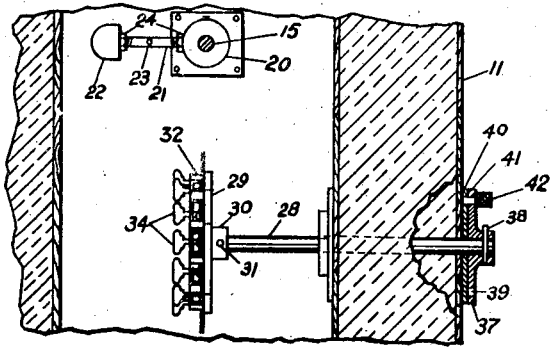
Fig. 3 is a sectional view along the line 3—3 of Fig. 2, the striking means of the apparatus being shown in raised position, ready to strike and flex a sample of elastic material.
Figure 4:
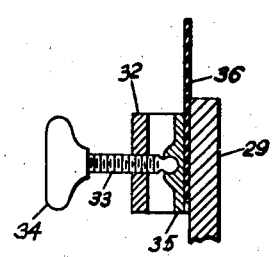
Fig. 4 is an enlarged sectional view of a specimen clamp, taken along the line 4—4 of Fig. 2.

Extending through a wall of cold box 11 and rotatably mounted therein is a stub shaft 28. Specimen jig 29 is provided with hub 30 rigidly fixed to stub shaft 28 by pin 31 as shown in Fig. 3. Specimen jig 29 is provided with twelve individual specimen clamps, details of which are shown in Fig. 4. Each specimen clamp comprises a U-shaped housing 32, the open end of which is welded or otherwise affixed to specimen jig 29. A screw 33 extends through the outer face of housing 32 and is in threaded engagement therewith. Rigidly secured to the outer end of screw 33 is wing nut 34. The other end of screw 33 is formed in the shape of a ball and clamping plate 35 is secured thereto, a raised portion of clamping plate 35 being peened about the ball end of screw 33. Clamping plate 35 holds specimen sample 36 against the specimen jig 29. A larger or smaller number of specimen clamps than illustrated can be provided on the specimen jig 29, and the specimen clamps can be constructed in any suitable manner other than that illustrated.

Stub shaft 28 extends through the wall of cold box 11 and to its outside end a control jig 37 is rigidly secured by pin 38. Control jig 37 is provided with a number of holes 39 corresponding in number to the number of specimen clamps provided on specimen jig 29. Holes 39 in control jig 37 also correspond in position with the location of the specimen clamps on the specimen jig 29, such alignment being assured by the position of the drilled hole provided for pin 38. Holes 39 can be numbered if desired so that such numbers indicate the position of each of said holes 39, and thereby indicate the corresponding position of each of the said specimen clamps 32 inside cold box 11. Encircling stub shaft 28 and secured to the outer wall of cold box 11 between said wall and the control jig 37 is a boss 40. Reference hole 41 is drilled through boss 40 at a position directly above stub shaft 28. Reference hole 41 corresponds in size and in distance from stub shaft 28 with the holes 39 in the control jig 37. Pin lug 42 is provided as a convenient grip means for an operator. The outer face of specimen jig 29 is located directly below the axis of shaft 15, and is coplanar with it. Stub shaft 28 is perpendicular to the outer face of specimen jig 29.

In the operation of the invention, specimen samples 36 are clamped in place on specimen jig 29 by clamping plates 35, the specimen samples 36 extending beyond the adjacent face of specimen jig 29. The specimen jig 29 is then placed on the end of stub shaft 28 and pinned thereto by pin 31. Any one of the specimen samples 36 desired is brought into position to be tested by means of pin lug 42 and is held in that position by the insertion of pin lug 42 into reference hole 41 in boss 40.

The interior of cold box 11 is brought to the temperature at which it is desired to begin a series of tests and held at that temperature for a short space of time. Shaft 15 is then rotated by means of handles 18 to raise arm 21 and hammer 22 to an approximately horizontal position. Arm 21 and handle 22 are then fixed in that position by inserting pin 27 into one of holes 26 just below the shank of the adjacent handle 18. Hammer 22 is then released by quickly pulling pin 27, whereupon hammer 22 swings downward under the pull of gravity, describing an arc about the axis of shaft 15. Hammer 22 strikes specimen sample 36 and bends it over the adjacent edge of specimen jig 29. The results of the impact and flexing of the specimen samples 36 are observed through window 13.

Hammer 22 is then returned to its up position by means of handle 18, and another specimen sample 36 is rotated into position by means of pin lug 42, whereupon this specimen sample 36 is struck and flexed in the same manner as was the previous sample. This procedure is repeated until all the specimen samples 36 mounted in the specimen jig 29 have been tested at that temperature.

The temperature of the cold box 11 can then be lowered a suitable number of degrees and held at such lower temperature for a short space of time, whereupon the series of striking and flexing tests can be repeated in the same manner. This procedure can be repeated until all the specimen samples 36 have become brittle and have broken, the results being observed and recorded by the operator.

The distance by which the lower surface of hammer 22 clears specimen jig 29 can be adjusted by means of adjustment pin 23 and lock nuts 24. Such adjustment changes the radius of bend to which the specimen samples are subjected under the impact of the hammer 22 and this is desirable in cases of varying thickness of specimen samples 36 and in cases where the materials being tested are destined for differing types of service.

For similar reasons the impact with which hammer 22 strikes and flexes specimen samples 36 can be varied by varying the number and size of the weights 19 placed upon handle 18, and also, by the use of different holes 26 for insertion of pin 27 to vary the height through which hammer 22 must fall before striking the specimen sample 36. To obtain comparable results in any given series of tests, the above mentioned variables will be fixed at a given set of conditions. That is, the clearance between the lower surface of hammer 22 and the specimen jig 29 will be kept constant, one of holes 26 will be selected and used throughout the series of tests, and the weights 19 on handle 18 will not be changed.

The leading and trailing edges of hammer 22 are rounded to a large radius so that the brittle point determinations are not affected by striking the specimen samples 36 with a sharp corner. The anti-friction bearings 16 are located outside of cold box 11 to prevent congealing of bearing lubricant under conditions of extreme cold. The location of said bearings 16 inside cold box 11 has been found to have an additional disadvantage in that in such location condensed moisture is prone to collect in the bearings when cover 12 is removed from cold box 11 and the interior of cold box 11 is warmed as a result thereof. Such moisture introduces corrosion difficulties and freezes when subjected to low temperature.

It is to be understood that various modifications and changes may be made in this invention without departing from the scope thereof as set forth in the appended claims.

The invention described herein may be manufactured and used by or for the Government of the United States of America for governmental purposes without the payment of any royalties thereon or therefor.

What is claimed is:

1. An apparatus for determining the brittle points of elastic materials comprising a regulable low temperature cabinet, a shaft rotatably mounted in said cabinet and extending therethrough, said shaft being supported by bearings outside said cabinet, means disposed outside said cabinet for turning said shaft and for holding it in any desired position, an arm radially extending from said shaft inside said cabinet, said arm being adjustably extensible, a hammer affixed to said arm, a stub shaft extending through one wall of said cabinet, a specimen jig rigidly affixed to the end of said stub shaft within said cabinet, the outer face of said specimen jig being disposed directly below said shaft and being coplanar with it, the outer face of said specimen jig also being perpendicular to said stub shaft, and means affixed to the end of said stub shaft outside said cabinet for rotating said specimen jig and for holding it in any desired position.

2. An apparatus for determining the brittle points of elastic materials comprising a regulable low temperature cabinet, a shaft rotatably mounted in said cabinet and extending therethrough, said shaft being supported by bearings outside said cabinet, means disposed outside said cabinet for turning said shaft and for holding it in any desired position, an arm radially extending from said shaft inside said cabinet, said arm being adjustably extensible, a hammer affixed to said arm, a stub shaft extending through one wall of said cabinet, a specimen jig rigidly affixed to the end of said stub shaft within said cabinet, the outer face of said specimen jig being disposed directly below said shaft and being coplanar with it, the outer face of said specimen jig also being perpendicular to said stub shaft, multiple individual specimen clamps on said specimen jig, and means affixed to the end of said stub shaft outside said cabinet for rotating said specimen jig and for holding it in any desired position.

3. An apparatus for determining the brittle points of elastic materials comprising a regulable low temperature cabinet, a shaft rotatably mounted in said cabinet and extending therethrough, said shaft being supported by bearings outside said cabinet, means disposed outside said cabinet for turning said shaft and for holding it in any desired position, said means being adapted to receive and hold a varying number of weights with the centers of gravity of said weights offset from the axis of said shaft, an arm radially extending from said shaft inside said cabinet, said arm being adjustably extensible, a hammer affixed to said arm, a stub shaft extending through one wall of said cabinet, a specimen jig rigidly affixed to the end of said stub shaft within said cabinet, the outer face of said specimen jig being disposed directly below said shaft and being coplanar with it, the outer face of said specimen jig also being perpendicular to said stub shaft, multiple individual specimen clamps on the outer face of said specimen jig, and means affixed to the end of said stub shaft outside said cabinet for rotating said specimen jig and for holding it in any desired position.

4. An apparatus for testing materials comprising a temperature cabinet, a shaft rotatably mounted in said cabinet and extending into said cabinet, a pendulum-type hammer on said shaft, means for rotating said shaft to raise and retain said hammer in selected position, a stub shaft extending into said cabinet, a jig on said shaft for fixedly holding a plurality of test specimens, means for indexing said stub shaft and said jig to bring a selected specimen into the path of travel of said hammer, and means for locking said stub shaft and jig in indexed position to hold the selected specimen in the path of travel of the hammer during pendulum movement of the hammer.

5. An apparatus for testing materials comprising a cabinet, a shaft rotatably mounted with respect to said cabinet and extending into said cabinet, a hammer on said shaft, means for rotating said shaft to move and retain said hammer in selected position, a second shaft extending into said cabinet, means on said second shaft for fixedly holding a plurality of test specimens, means for indexing said second shaft and said holding means to bring a selected specimen into the path of travel of said hammer, and means for locking said second shaft and holding means in index position to hold the selected specimen in the path of travel of said hammer during movement of said hammer.

CLARENCE K. CHATTEN.
SAUL A. ELLER.

REFERENCES CITED

The following references are of record in the file of this patent:

UNITED STATES PATENTS

| Number | Name | Date |
|---|---|---|
| 2,377,590 | Talalay | June 5, 1945 |

FOREIGN PATENTS

| Number | Country | Date |
|---|---|---|
| 690,923 | Germany | May 10, 1940 |

OTHER REFERENCES

Journal of Applied Physics, vol. 15, No. 11 (November 1944), pp. 767 and 768, copy in Class 73, subclass 15.6.